(12) United States Patent
Cadoret et al.

(10) Patent No.: US 7,654,842 B2
(45) Date of Patent: Feb. 2, 2010

(54) ELECTRICAL OR OPTICAL OR HYDRAULIC CONNECTOR THAT SELF-ALIGNS THE PLUG WITH RESPECT TO THE BASE, PARTICULARLY FOR OFFSHORE CONNECTIONS

(75) Inventors: Yves Cadoret, Le Mans (FR); Mathieu Benoist, Acigne (FR)

(73) Assignee: Carrier Kheops BAC, Le Mans (FR)

( * ) Notice: Subject to any disclaimer, the term of this patent is extended or adjusted under 35 U.S.C. 154(b) by 167 days.

(21) Appl. No.: 11/858,492

(22) Filed: Sep. 20, 2007

(65) Prior Publication Data
US 2008/0085619 A1 Apr. 10, 2008

(30) Foreign Application Priority Data
Sep. 20, 2006 (FR) .................. 06 08222

(51) Int. Cl.
*H01R 13/64* (2006.01)
(52) U.S. Cl. ..................................... 439/247
(58) Field of Classification Search ................. 439/247, 439/248
See application file for complete search history.

(56) References Cited
U.S. PATENT DOCUMENTS 3,094,364 A * 6/1963 Liagg .................. 439/247
3,546,658 A * 12/1970 Van Horssen et al. ....... 439/318
4,076,361 A 2/1978 Campbell
4,179,171 A * 12/1979 Shannon ................ 439/189
4,508,404 A * 4/1985 Frawley ................. 439/153
4,682,847 A * 7/1987 Moore et al. ............. 439/271
4,840,574 A * 6/1989 Mills .................... 439/191
5,240,446 A * 8/1993 Boatman et al. ............ 441/3
2006/0199433 A1 9/2006 Riggs et al.

FOREIGN PATENT DOCUMENTS

EP 0 311 171 A1 4/1989
FR 2 607 635 A1 6/1988

* cited by examiner

*Primary Examiner*—Neil Abrams
*Assistant Examiner*—Harshad C Patel
(74) *Attorney, Agent, or Firm*—Sughrue Mion, PLLC

(57) ABSTRACT

The invention pertains to an electrical, optical or hydraulic connector (1) equipped with an electrical, optical or hydraulic plug, respectively, intended to be connected to an electrical, optical or hydraulic base, that self-aligns the plug (3) relative to the base (5), particularly for "offshore" connections, in which the plug (3) and the base (5) are attached to respective support parts (11, 7) intended to be positioned with respect to one another in order to approximately align the plug (3) and the base (5) in order to connect said plug and base to one another, characterized in that it has a mechanical driving mechanism (19) enabling the plug (3) or the base (5) to move forward or backward, in order to be connected into the base (5) or the plug (3), respectively, and a self-aligning mechanism (17) for the plug (3) or the base (5) relative to the base (5) or the plug (3), respectively.

17 Claims, 4 Drawing Sheets

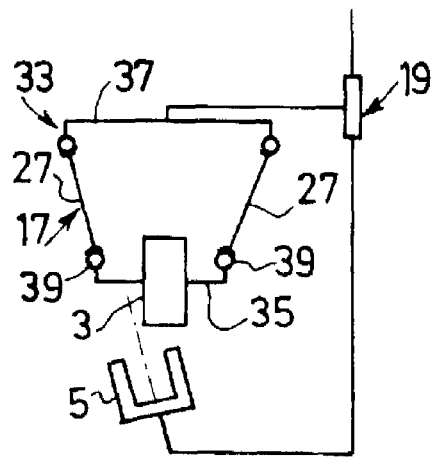
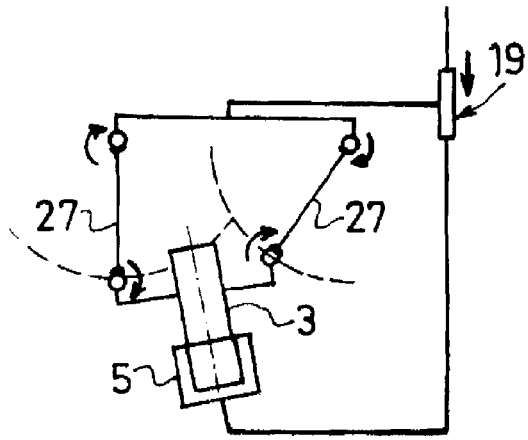
FIG.4        FIG.6
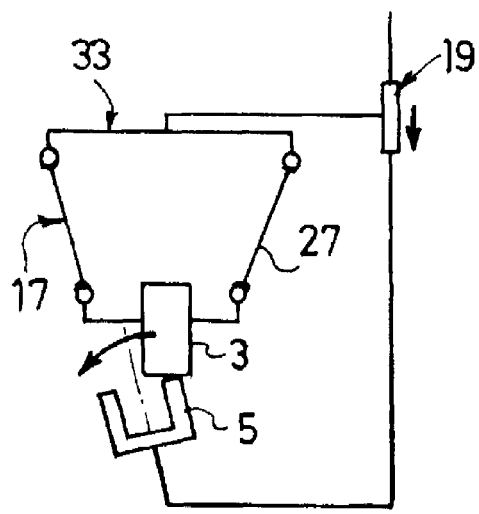
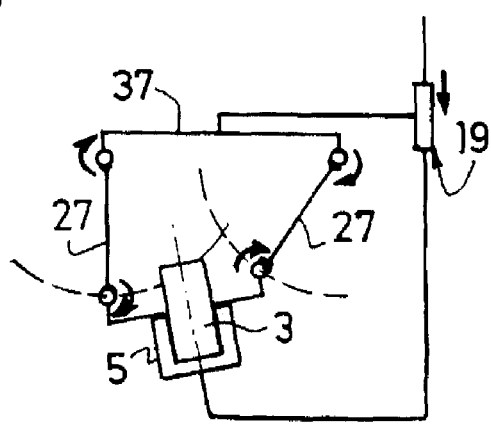
FIG.5        FIG.7

ELECTRICAL OR OPTICAL OR HYDRAULIC CONNECTOR THAT SELF-ALIGNS THE PLUG WITH RESPECT TO THE BASE, PARTICULARLY FOR OFFSHORE CONNECTIONS

BACKGROUND OF THE INVENTION

This invention pertains to an electrical or optical or hydraulic connector that self-aligns the plug with respect to the base, particularly for "offshore" connections, and in particular a connector in which the male plug and the receptacle base are each attached to respective support parts, which are intended to put them into alignment with one another to connect the connector. However, the alignment of these parts with one another, due to their large dimensions and the complex, limited environment in which they are used in offshore applications, is imperfect, and the alignment of the plug and the base of the connector when connecting them cannot be guaranteed, such that it is necessary to have a self-aligning mechanism for the plug and the base in order to connect them.

SUMMARY OF THE INVENTION

The support parts for the plug and the base of the connector can turn with respect to one another, such that it is necessary to obtain at least one angular, and therefore radial, adjustment of the plug relative to the base.

The purpose of the invention is to meet these needs and to offer an electrical or optical or hydraulic connector equipped with an electrical, optical or hydraulic plug, respectively, intended to be connected to an electrical, optical or hydraulic base, of the kind that self-aligns the plug relative to the base, particularly for "offshore" connections, the plug and the base being attached to respective support parts intended to position one with respect to the other in order to approximately align the plug and the base when they are connected to one another, characterized in that it includes a mechanical driving mechanism enabling the plug or the base to move forward and backward, in order to connect it to the base or the plug, respectively, and a self-aligning mechanism for the plug or the base relative to the base or the plug, respectively, making it possible to adjust the angular, radial and alignment positioning gaps of the plug relative to the base when they are connected to one another.

Said mechanical driving mechanism is preferably separate from the self-aligning mechanism. It can be traditional, consisting of at least one linear actuator for the plug or the base relative to the base or the plug, respectively. However, these mechanisms can be combined to function jointly.

Said self-aligning mechanism may include at least two connecting rods mounted trapezoidally on each side of the plug or the base, connected, on the one hand, to the plug or to the base, along a first base of the trapezoid, and on the other hand, to the support part of the plug or the base, respectively, along a second base of the trapezoid.

At least two connecting rods may be mounted in a median plane, or even an axial plane, of the connector.

Naturally, a clearance volume must be given to the plug or the base for its self-aligning positioning relative to the base or the plug, respectively, and this volume can be protected by an insulating casing part, which can also slide into complementary housing for the corresponding support piece and act as a linear actuator for the plug or the base of said mechanical driving mechanism.

As a result of this arrangement, the plug or the base is mounted on a jointed trapezoid, which changes shape when approaching and when in contact with the complementary part, base or plug to direct the axis of the plug into alignment with that of the base, after which the plug can be connected into the base using said mechanical driving mechanism.

Naturally, the receptacle part of the base (or of the plug) has an opening, the dimensions of which are slightly larger at the external end of the plug (or the base), respectively, and/or is flared out, such that the capture of the plug or the base by the complementary receptacle part and its insertion to make the connection are facilitated.

Naturally, the length of the connecting rods and the positioning of the plug or the base on the first base of the trapezoid are calculated so that, when the plug approaches the base or when the male part approaches the receptacle part, said parts can be oriented coaxially.

The trapezoid can be isosceles, and the plug or the base can be mounted in the median part of the small base.

The trapezoid can also be positioned in a median plane of the connector, or even in a diametral plane, when the connector is configured cylindrically. It can also be mounted in a plane parallel to the median plane, being separated from said median plane.

Moreover, in order to facilitate the adjustment of the clearance, and in particular the positioning clearance for the plug relative to the base, the joint connection of the connecting rods can be made with a clearance that allows said rods to be extended, for example by positioning at least one connecting rod axis into an oblong hole of the joint, thus allowing the axis to move.

Said joint connection can be a pivot with clearance, a sliding pivot or a ball and socket with partial angular clearance, so as to also adjust the misalignment, in terms of height, of the plug and the base.

The connecting rods can also be telescoping, with linear actuators for extending or shortening them.

When necessary, the plug and the base can each have a self-aligning mechanism, such that the plug and the base align themselves jointly when connecting to one another.

BRIEF DESCRIPTION OF THE DRAWINGS

The invention is illustrated below through one example of implementation, and in reference to the appended drawings, in which:

FIGS. 4 to 7 are illustrations of the connector's self-aligning kinematics.

DETAILED DESCRIPTION OF THE NON-LIMITING EMBODIMENTS OF THE INVENTION

Figure 1:
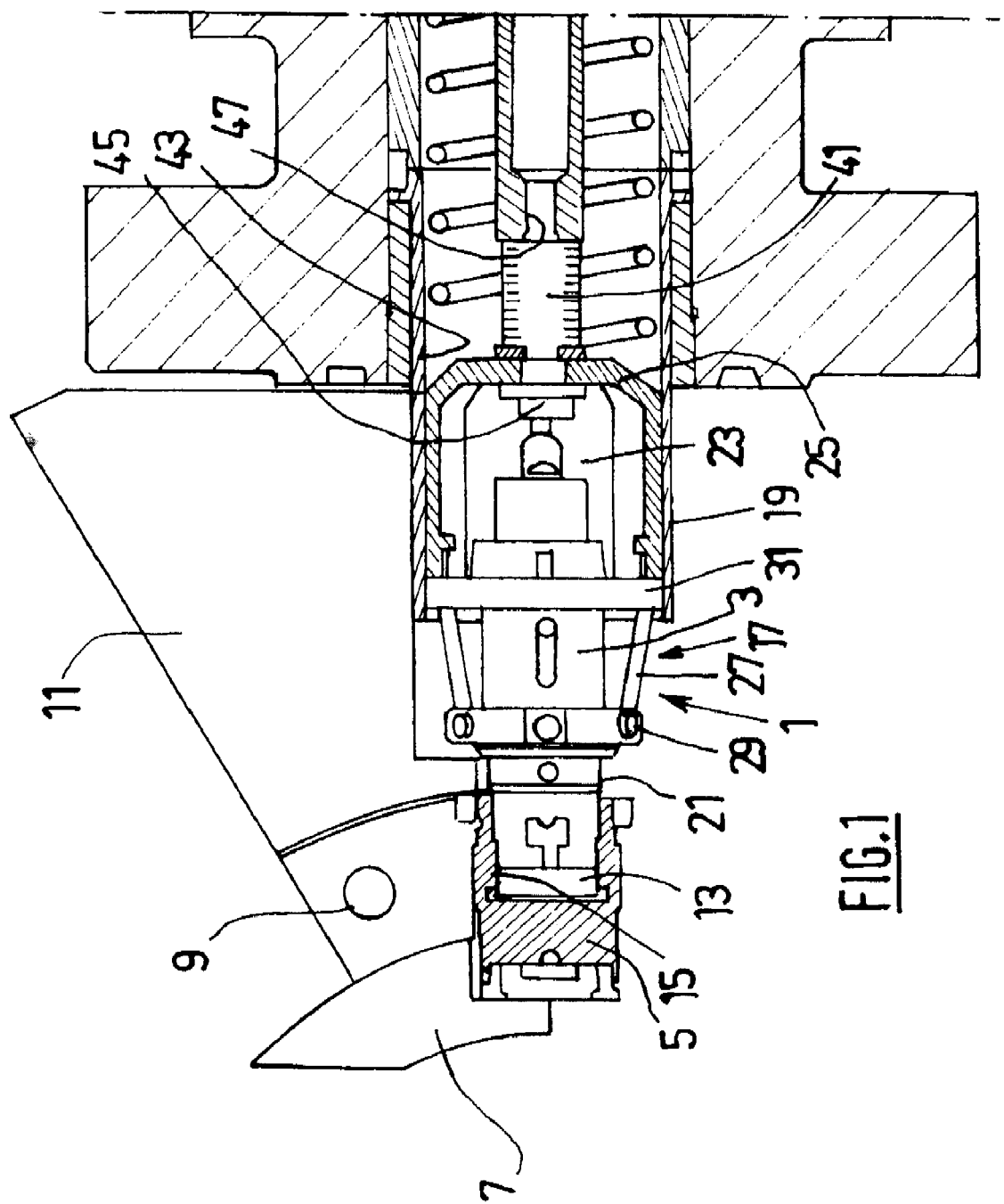
FIG. 1 is a cross-section viewed from above, of a connector described in the invention and of the support pieces for the connector.

In reference to the figures in the drawings, and in particular in FIG. 1, we have described an electrical connector (1) according to the invention, which has been adapted for offshore applications, and in particular for a petroleum well head.

The connector is configured cylindrically. It has an electrical plug (3) and base (5), each mounted on a respective support part, and specifically a vertical cylindrical mobile tube (7) known as a "tubing hanger" equipped with a part (9) that houses the base known as "tubing hanger housing", and a complementary fixed part (11) housing the plug, known as a "bonnet", making it possible to adapt a remotely operated vehicle (ROV) (not depicted) that moves the plug (3) in order to connect it to, or disconnect it from, the base.

In service, the rotary vertical tube part (7) is intended to be positioned and fixed in terms of height and rotation relative to the fixed bonnet part (11), so as to enable the (very close) alignment of the plug (3) and the base (5) of the connector.

However, due to the complexity of the pieces in question, their large dimensions and the small amount of space available, the alignment is not perfect, and the connector would risk being damaged or not connecting. The connector described in the invention, which is "self-aligning", makes it possible to compensate for the lack of alignment and to connect the plug (3) into the base (5) with an angular gap in the pieces (7, 11) of approximately ±1.5 degrees at approximately 185 mm from the center of rotation, which is equivalent to a radial misalignment of the plug (3) relative to the base (5) of approximately 5 mm, and with a height gap between said plug and base of approximately ±1.14 mm.

FIG. 1 is a view from above of the connector (1) in the connected position. In particular, we see that the projecting male part or the male cylindrical plug (13) at the end of the plug (3) is inserted coaxially into the complementary female part or receptacle part (15) of the base (5).

Figure 2:
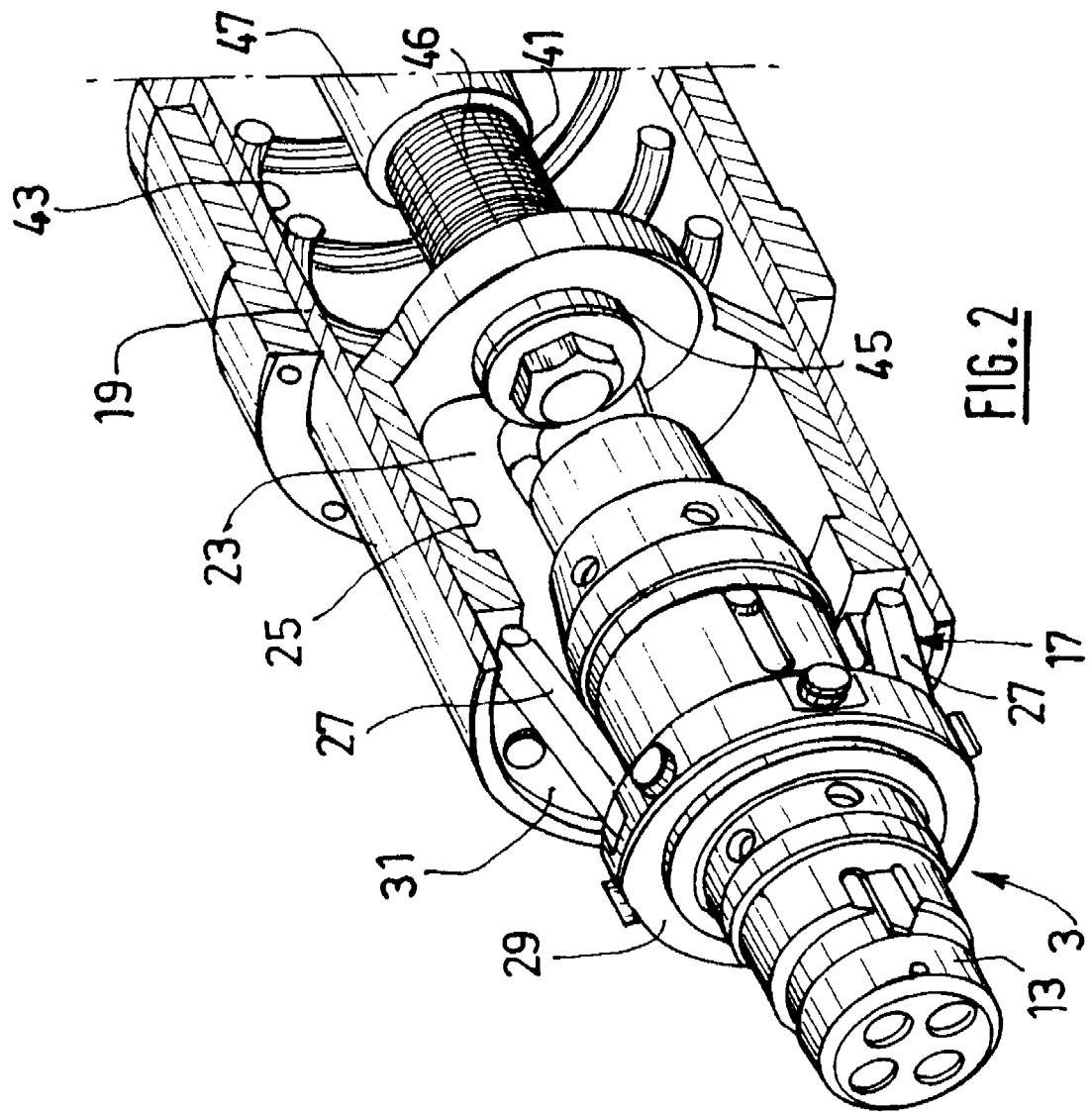
FIG. 2 is a partial cross-section of the plug of the connector and its support piece.

In order to be able to make this connection, it is necessary for the plug (3) and the base (5) to be perfectly coaxially aligned. In order to do this, the plug (3), the mobile element of the connector, has (FIG. 2) a self-aligning mechanism (17) and a mechanical driving mechanism (19) connected to the plug (3). In order to facilitate connection, the input opening (21) of the receptacle part (15) of the base (5) is slightly flared out, with an input diameter that is slightly larger than that of the male plug (13).

The self-aligning mechanism (17) will now be described.

The plug (3) is mounted on its front part, behind the male plug (13), on the self-aligning mechanism (17) and is received by its back part into a back clearance space (23), which is surrounded by a cylindrical casing part or bell (25), coaxial to the plug (3) outside of the clearance.

The self-aligning mechanism (17) consists essentially of two opposite, identical connecting rods (27), which are connected to the body of the plug (3) by a front ring (29) that is attached to said body, and are connected to the casing part (25) by a back ring (31) attached to its peripheral edge. The rings (29, 31) are mounted in a position of axial symmetry (perpendicular to the axis). The connecting rods (27) are mounted in a median longitudinal plane of the plug (3), being attached to said rings (29, 31) as a set connected in the form of an isosceles trapezoid (33) (FIG. 4), in a centered position (without angular clearance of the plug).

The connecting rods (27) are inclined (35) forward, such that the plug (3) is attached to the small base (35) of the trapezoid in a position in which it is centered on said small base, and likewise, the large base (37) of the trapezoid is connected to the piece (25) supporting the plug, in a centered position, by the back ring (31).

Figure 3:
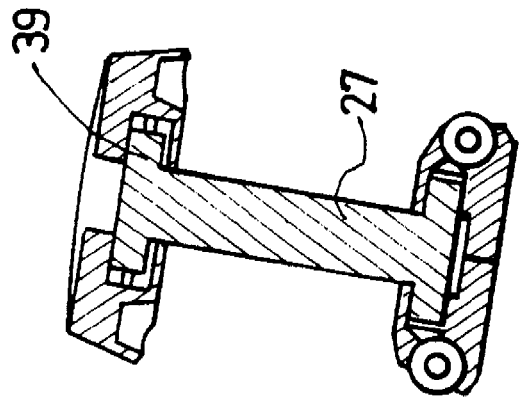
FIG. 3 is a cross-section of a connecting rod of the connector's self-aligning mechanism.

The joint connections of the connecting rods (27) on the rings (29, 31) are of the pivot type (39) with clearance (FIG. 3), so as to make it possible to also adjust the alignment gap, in terms of height, between the plug (3) and the base (5) and to slightly lengthen the connecting rod (27) into the bending of the trapezoid (33).

Once this is done, the plug (3) is angularly mobile within the plane of the connecting rods (27) and is also mobile slightly away from this plane, to adjust the misalignment in terms of height. The clearance of the plug (3) is free within the back casing part (25), which is preferably electrically insulated.

The mechanical driving mechanism (19) of the plug (3) for connecting it to or disconnecting it from the base (5) consists essentially of a linear actuator (41) attached to the casing part (25), which is mounted to slide within a complementary cylindrical chamber (43) mounted coaxially to the axis of the connector and attached to the support part (11) of the plug.

In this case, the actuator is a screw actuator (46), the end of which (45) is attached to the back median part of the casing part (25) and in which the turning part or nut (47) gripping the screw is rotated by said remotely operated vehicle in order to push or pull the plug (3).

The functioning of the connector (1) will now be described in reference to FIGS. 4 to 7.

First, we will begin with the connector in the disconnected position (FIG. 4), the support parts (7, 11) of the plug (3) and of the base (5) having been previously positioned for the connection. The plug (3) and the base (5) are thus separated from one another and misaligned within the limits of the aforementioned (or other) values of angular or height separation, depending on the connector.

The first step consists of driving the plug (3) so that it touches the base (5) with the end of the male plug (13). Because the base (5) is fixed, this driving changes the shape of the connection set (33) of the connecting rods (27) by turning the male plug (13), on the one hand, and by moving it to the left (to the left in the drawing) as shown in FIGS. 5 and 6.

At the stage of positioning depicted in FIG. 6, the plug (3) and the base (5) are perfectly aligned and the angular and height gaps have been adjusted. The only remaining step is to activate the mechanical driving mechanism (19) of the plug to proceed with the connection and push the male plug (13) coaxially to the base (5).

Once the connection is made (FIG. 7), the male plug (13) is in contact with the inner floor of the base (5) and locks into connection with said base, and the mechanical driving mechanism (19) stops.

The connector is now connected and the connection has been made perfectly.

The disconnection process occurs inversely to the connection process, by removing the male plug (13) from the base (5) using said mechanical driving mechanism (19).

Naturally and as mentioned above, the many parameters involved in the functioning of the connector can be adjusted, such as, for example, the length of the connecting rods (27), the position of the plug (3) and/or the base (5) on the small base (35) of the trapezoid (the connector being able to receive the base (5), inversely to the plug (3), on the small base (35) of the trapezoid (33), or both jointly), the pivoting clearance of the connecting rods (27), the telescoping extension of the connecting rods (27), and others.

The invention also applies to optical or hydraulic (and pneumatic) connectors, the complementary male and female parts of which are assembled to one another and require the self-alignment of these parts in a similar manner to the electrical connector described above.

Figure 8:
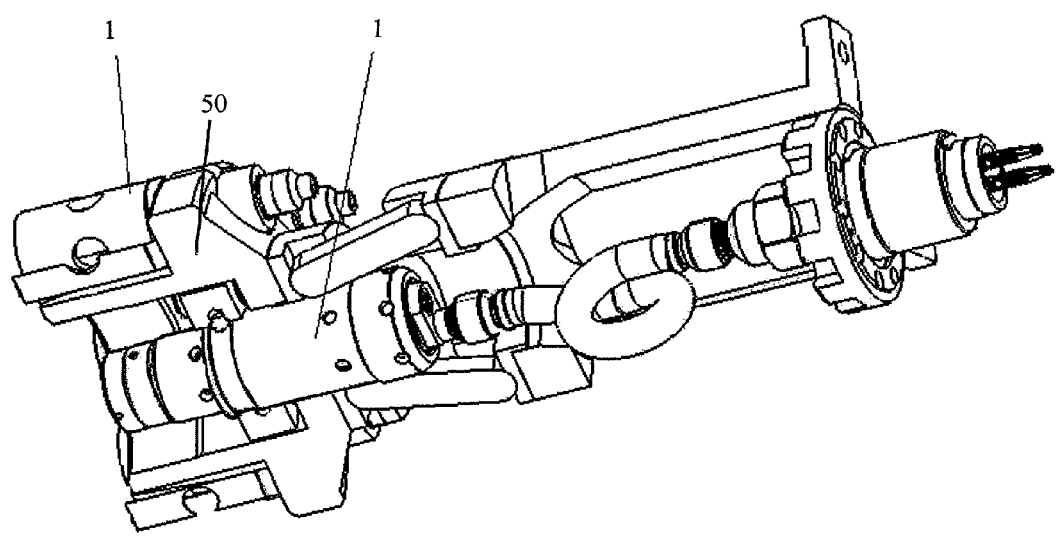
FIG. 8 is a cross-section viewed from above, of two connectors mounted on a same support.

Moreover, the invention could also apply to a combination of electrical, optical, hydraulic or pneumatic connectors 1 (at least two), mounted on a shared support 50 (as shown in FIG. 8) and requiring the joint self-alignment of their complementary parts.

The invention claimed is:

1. An electrical or optical or hydraulic or pneumatic connector equipped with an electrical or optical or hydraulic or pneumatic plug, respectively, that connects to an electrical or optical or hydraulic or pneumatic base, in which the plug self-aligns relative to the base, particularly for "offshore" connections, the plug and the base being attached to respective support parts that position one relative to the other in order to achieve approximate alignment of the plug and the base in order to connect the plug and the base to one another, the connector further comprising a mechanical driving mechanism enabling the plug or the base to move forward and backward, so that the base connects with the plug, respectively, and a self-aligning mechanism for the plug or the base relative to the base or the plug, respectively, to adjust angular, radial and alignment positioning gaps between the plug and the base when the plug and the base are connected to one another, wherein the self-aligning mechanism has at least two connecting rods mounted as a jointed trapezoid on each side of the plug or the base, connected, on one end, to the plug or to the base along a first base of the jointed trapezoid, and on the opposite end, to the support part of the plug or the base, respectively, along a second base of the jointed trapezoid.

2. The connector described in claim 1, wherein the mechanical driving mechanism of the plug or the base includes at least one linear actuator for the plug or the base relative to the base or the plug, respectively.

3. The connector described in claim 1, wherein the first base of the jointed trapezoid is a small base of the jointed trapezoid and the second base is a large base of the jointed trapezoid.

4. Connector described in claim 1, wherein the length of the connecting rods and the positioning of the plug or the base on the first base of the jointed trapezoid are such that, when the male plug approaches the base or the receptacle part, the coaxial orientation of the plug and the base is allowed.

5. The connector described in claim 1, wherein the jointed trapezoid is isosceles, and the plug or the base is mounted in the median part of the small base.

6. The connector described in claim 1, wherein the jointed trapezoid is positioned in a median plane of the connector or in a diametral plane, when the connector is configured cylindrically.

7. The connector described claim 1, wherein the jointed trapezoid is mounted in a plane that is parallel to the median plane, being separated from said median plane.

8. The connector described in claim 1, wherein, in order to facilitate clearance adjustments, and in particular positioning clearance in terms of height of the plug relative to the base, the joint connection of the connecting rods is provided with a clearance to allow the connecting rods to extend by positioning at least one axis of the connecting rods into an oblong hole of the joint, thus allowing the axis to move.

9. The connector described in claim 8, wherein the joint connection is a pivot with clearance, a sliding pivot or a ball and socket with partial lateral angular clearance.

10. The connector described in claim 1, wherein the connecting rods are telescoping, including linear actuators to extend or shorten the connecting rods.

11. The connector described in claim 1, wherein the connecting rods are attached to two coaxial rings, outside of the clearance, in which the front ring receives the plug or the base and the back ring is mounted to be attached to the support piece of the plug or the base, respectively.

12. The connector described in claim 1, wherein the plug and the base each have a self-aligning mechanism such that the plug and the base align themselves jointly when being connected to one another.

13. The connector described claim 1, wherein the plug or the base is mounted on the jointed trapezoid, which changes shape when it approaches or comes into contact with the base or the plug respectively, after which the plug can be connected into the base by the mechanical driving mechanism.

14. The connector described in claim 1, wherein the base or the plug has a receptacle part in which the opening has slightly larger dimensions at the external end of the plug or the base, respectively, and/or is flared out, such that the capture of the male part of the plug or the base by the complementary receptacle part and its insertion to make the connection are facilitated.

15. The connector described in claim 1, wherein a clearance volume for the plug or the base is provided so that the plug or the base self-aligns into position relative to the base or to the plug, respectively, the clearance volume being surrounded by an insulating casing part.

16. The connector described in claim 15, wherein the insulating casing part slides inside a complementary housing or chamber of the support piece, and acts as a linear actuator for the plug or the base of the mechanical driving mechanism.

17. A combination of connectors, wherein at least two connectors as defined in claim 1 are mounted on a same support part, with self-alignment of their complementary parts.

* * * * *